Figure 2:
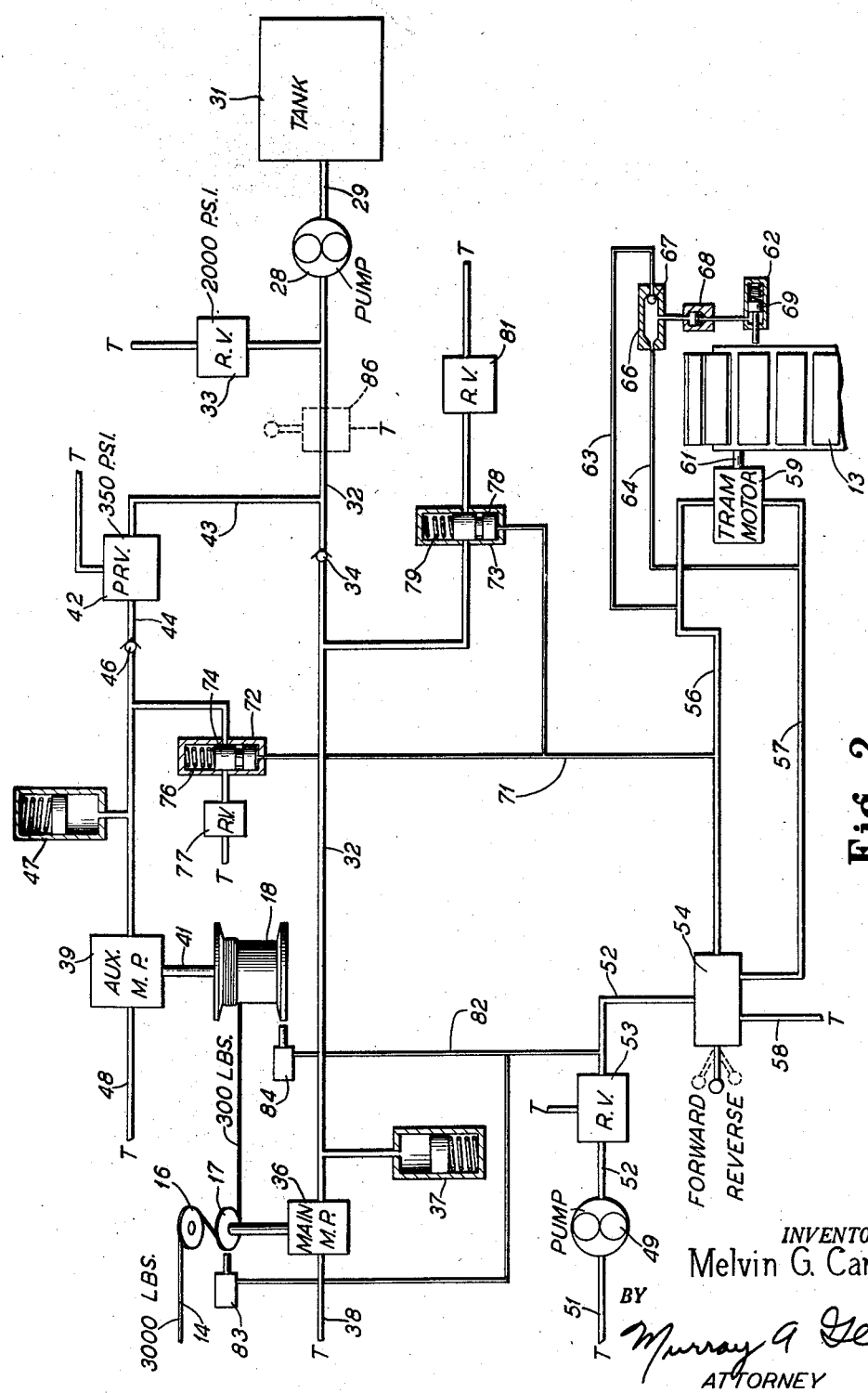

Sept. 9, 1958            M. G. CARLSON           2,851,153
HYDRAULIC CIRCUIT FOR MOVABLE SECTION OF
FLEXIBLE STRAND CONVEYORS
Original Filed May 25, 1956           2 Sheets-Sheet 1
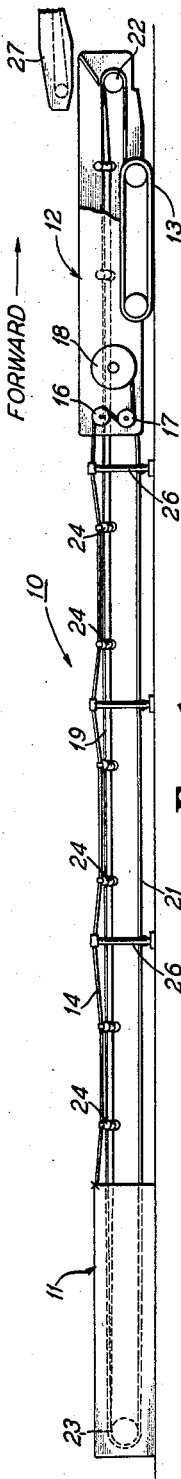
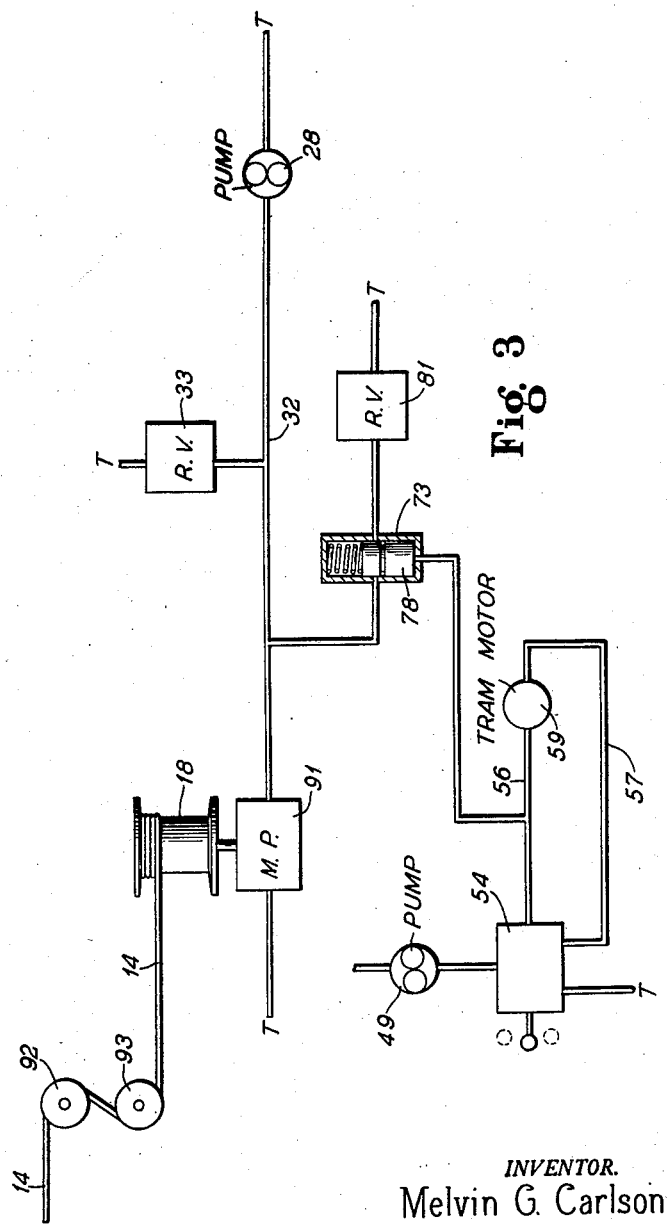
INVENTOR.
Melvin G. Carlson
BY
Murray A. Gleeson
ATTORNEY

United States Patent Office 2,851,153
Patented Sept. 9, 1958

2,851,153

HYDRAULIC CIRCUIT FOR MOVABLE SECTION OF FLEXIBLE STRAND CONVEYORS

Melvin G. Carlson, Oak Lawn, Ill., assignor to Goodman Manufacturing Company, Chicago, Ill., a corporation of Illinois Continuation of application Serial No. 587,266, May 25, 1956. This application May 22, 1957, Serial No. 661,989

14 Claims. (Cl. 198—208)

This invention relates generally to extensible conveyors of the type supported upon spaced flexible strands, and more particularly to an improved hydraulic circuit whereby the strand tensions are maintained at a substantially uniform value when one of the anchoring sections for the strand is moved, particularly in a conveyor extending direction.

One of the principal objects of the invention is to maintain a uniform tension upon the support strands of an extensible conveyor of the type where the conveying reach is supported upon such strands.

Another object is to maintain substantially uniform tension upon such support strands, both when one of the anchoring sections is stationary and when such anchoring section is moved in a conveyor extending direction.

Yet another object is to maintain substantially uniform tension on the strands irrespective of whether such anchoring section is moving in a conveyor extending or a conveyor shortening direction.

Another object is to maintain the support strands of such a conveyor at a predetermined tension, and to provide an hydraulic circuit therefor which is varied in its output pressure when a control valve for the tramming means for such anchoring section is actuated.

Other objects and important features of the invention will be apparent from a study of the specification following taken with the drawings which together describe and illustrate a number of preferred embodiments of the invention, and what are now considered to be the best mode of practicing the principles thereof. Other embodiments may be suggested to those having the benefit of the teachings herein, and such other embodiments are intended to be reserved especially as they fall within the scope and spirit of the subjoined claims.

This application is a continuation of my application Serial No. 587,266, filed May 25, 1956, now abandoned.

In the drawings:

Fig. 1 is a side elevational view of an extensible conveyor of the type where the conveying reach thereof is supported upon spaced flexible strands, said strands being trained along parallel courses between head and tail sections, the tail section having embodied therewith the improvements according to the present invention;

Fig. 2 is an hydraulic circuit for controlling the tension of the support strands both when the tail section of Fig. 1 is stationary and when it is being trammed in both conveyor extending and conveyor shortening directions; and Fig. 3 is a simplified hydraulic circuit for effecting the proper tension upon the support strands both when the tail section is stationary and when it is tramming in a conveyor extending direction.

Referring now to Fig. 1 of the drawings, there is shown an extensible conveyor indicated generally by the reference numeral 10. Such a conveyor includes a head section 11 and a tail section 12 mounted for tramming movement upon endless crawler treads 13. A pair of flexible strands 14 are trained along parallel courses between the head section 11 and the tail section 12, and are reeved around pulleys 16 and 17, the strand 14 being stored upon a storage reel 18.

The extensible belt conveyor 10 has a conveying reach 19 and a return reach 21, the two reaches being reversed in direction about a tail pulley 22 on the tail section 12 and about a driving pulley 23 at the head section 11.

A plurality of troughing roller assemblies 24 are disposed at intervals throughout the length of the spaced flexible strands 14 for support of the conveying reach 19, and the strands 14 are supported at points throughout the length thereof by standards 26. Details of the construction of such a conveyor are as more clearly disclosed in Craggs et al. application, Serial No. 521,355, filed July 11, 1955, for Rope Frame Conveyor and Troughing Roller Assembly Therefor.

The entire extensible conveyor 10 is generally disposed in a room behind a mining machine of the continuous type, and such a machine may be provided with a discharge conveyor 27 which discharges upon the tail section 12. As the discharge conveyor 27 advances with the continuous mining machine the tail section 12 is also arranged to follow such advances.

The head section 11 accordingly is provided with a belt take-up loop as may be shown in the application of Craggs and McCam Serial No. 548,662, filed November 23, 1955, for Extensible Conveyor.

Means are provided for driving the storage reel 18 to impose tension upon the slack end of the strand 14, and for driving the pulleys 16 and 17 to impose a higher value of tension on the strand 14 between such pulleys and the head section 11. Such means comprises a pump 28 connected by a conduit 29 to a tank 31. The output from the pump 28 is connected to a pressure line 32, the pressure in the line 32 being regulated by a pressure relief valve 33 which may be set at a value of 2000 p. s. i. or the like. The pressure line 32 is connected through a check valve 34 to supply a motor pump 36 and a spring-loaded accumulator 37, the exhaust from the motor pump 36 being returned to the tank 31 by a tank line 38.

Pressure fluid at a lower working value is supplied to an auxiliary motor unit 39, connected by a shaft 41 to drive the storage reel 18. The lower working pressure is maintained at the auxiliary motor pump 39 by means of a pressure reducing valve 42 having its input connected by a line 43 to a point intermediate the check valve 34 and the pressure relief valve 33. The pressure reducing valve may be set at a value of 350 p. s. i. or the like. The discharge side of the pressure reducing valve 42 is connected to a pressure line 44 having a check valve 46 therein, and pressure fluid is stored in a spring loaded accumulator 47, the line 44 being also connected to the auxiliary pump 39. Spent fluid from the motor pump unit 39 is connected by a tank line 48 to the tank 31.

The apparatus thus far shown is arranged to impose, by way of example, a tension of 3,000 pounds on the strand 14 between the pulleys 16 and 17, and a tension of 300 pounds on the portion of the strand between the pulley 17 and the storage reel 18.

Under conditions when the tail section 12 is trammed in an inby direction in following the advance of the discharge conveyor 27, the motor pump units 36 and 39 will act as pumps, and the tension in the strand 14 between the pulleys 16 and 17 and the head section 11 will increase unless the back pressure is reduced. Otherwise, the position of the support standards 26 may be disturbed.

The crawler tread 13 is operated by a separate tramming motor and upon operation of such tramming motor in a conveyor extending direction, means are provided which causes a lower back pressure across the motor pump units 36 and 39 to maintain the strand tensions at substantially the same value as before.

The operation of the crawler tread 13 in a direction to shorten the conveyor also maintains a higher working pressure across the motor-pump units 36 and 39 which at such time wind in the strand 14 and operate as motors.

The operation of the crawler tread 13 is effected by a tram pump 49 having its input side connected by a line 51 to the tank 31, the output from the tram pump 49 being connected to a line having a relief valve 53 therein. A tram control valve 54 is connected to the line 53 and has a pair of working lines 56 and 57 therefrom, line 56 being considered the working line upon forward movement of a tram motor 59, line 57 under such condition being an exhaust line, and being connected to a tank line 58 through the tram control valve 54. During reverse operation the line 57 becomes a working line and line 56 becomes a tank line, in a manner known to those in the art.

The tram motor 59 is connected across the working lines 56 and 57 and has a shaft 61 which drives the crawler tread 13. A tram brake 62 for the crawler tread 13 is of the type which causes locking of the crawler tread 13 when the tram control valve 54 is in the neutral position. The tram brake 62 is moved to released position by means of a pair of lines 63 and 64 connected across the working lines 56 and 57 and having a shuttle valve 66 connected therein. The shuttle valve 66 has a ball 67 movable therein which shifts to a position to supply pressure fluid past a throttle 68 to admit fluid against a piston 69 of the tram brake 62 to release crawler tread 13.

Means are also provided during the forward operation of the crawler tread 13 to provide a lower back pressure across the motor-pump 36 (which now acts as a pump) for the driving pulleys 16 and 17 and a lower back pressure across the auxiliary motor-pump 39 (which now also acts as a pump) for the storage drum 18. To this end operation of the tram control valve in the forward direction causes fluid under pressure to be manifested in a line 71 branching from the working line 56. The pressure in said line operates shuttle valves 72 and 73.

Shuttle valve 72 has a spool 74 therein shiftable against the bias of a spring 76 to relieve the pressure in the accumulator 47 past a relief valve 77 set at a lower relieving pressure than pressure reducing valve 42. The back pressure on the motor pump 39 will be accordingly lessened to maintain the tension of the portion of the strand between the sheaves 17 and the storage reel 18 at a lower value.

The shuttle valve 73 likewise has a spool 78 which is shifted against the bias of a spring 79 to cause the pressure of the fluid in the line 32 to be relieved at a lower value through a pressure relief valve 81. It will be seen that the back pressure on motor-pump 36 will likewise be lowered, so that during the tramming operation the tension in the strand 14 between the pulley 16 and the head section 11 will be maintained at substantially the same value even though the tail section 12 is being trammed in a direction away from the head section 11.

When control valve 54 is operated in the reverse direction to shorten the conveyor, line 57 becomes the working pressure line and line 56 the exhaust line to tank through valve 54. The pressure in line 71 is insufficient to operate shuttle valves 72 and 73 and lines 32 and 44 supply motor-pump units 36 and 39 at a higher working pressure to drive them as motors to wind up strand 14 upon storage drum 18.

Ordinarily the storage drum 18 and the pulleys 16 and 17 are maintained in a locked position when the tram pump 49 is not being operated. Upon operation of said pump, however, pressure is manifested in a line 82 branching from the line 52 to release brakes 83 and 84 whereby the tension upon the strand 14 may be controlled by the main motor pump 36 and the auxiliary pump 39. The brakes 83 and 84 are similar in construction to the brakes 62, and are of the sprag type to lock the pulley 17 and the drum 18.

It will be noted that the accumulators 37 and 47 serve to maintain the proper pressure across the motors 36 and 39, and serve to take care of any internal leakage of the motors 36 and 39.

It will be observed that during reverse operation of the crawler treads motor-pump units 36 and 39 act as fluid motors, and full pressure is effective thereacross from the pump 28.

It will be noted also that the brake 62 at the crawler tread, and the brakes 83 and 84 are released whenever fluid is supplied for tramming of the tail section 12. At any time there is a loss of power to the tram pump 49 the tension will be maintained on the strand 14 by reason of the brakes 83 and 84. The crawler tread 13 will be maintained in locked position by its brake 62.

In order to minimize wear upon the pump 38, when the entire conveyor is kept at a desired length for protracted periods, the output from the pump 28 may be discharged directly to tank through a dump valve 86. When the output from pump 28 is directly discharged to tank, the brakes 83 and 84 maintain tension on the strand 14.

Referring now to Fig. 3 of the drawings, there is shown a simplified circuit diagram where the pump 28 is arranged to supply a motor pump unit 91 for the storage drum 18. In this embodiment of the invention the strand 14 is reeved about a pair of idler pulleys 92 and 93. The pressure to the motor pump 91 is in this case controlled by the pressure relief valve 33, and the output line 32 is directly conected to the motor pump 91.

During tramming in an inby or conveyor extending direction, when the control valve 54 is operated to the forward position, and the tramming pump 49 is connected to drive the tram motor 59 in the forward direction, the shuttle valve 73 has its spool 78 shifted to a position to cause the line 32 to be relieved by the pressure relief valve 81 in a fashion as before. Under such condition motor pump unit 91 acts as a pump with a lower back pressure thereagainst.

During tramming in an outby or conveyor shortening direction, control valve 54 is operated in the opposite direction, and tramming pump 49 is connected to drive the tram motor 59 in the reverse or outby direction to shorten the conveyor. Under this condition of operation line 56 is an exhaust line from the tram motor 59 and shuttle valve 73 will not have its spool 78 shifted, thus blocking low pressure relief valve 81, and maintaining the pressure in line 32 as determined by high pressure relief valve 33. This higher pressure is effective to drive motor-pump unit 91 as a motor to take up the strand 14 and maintain the tension therein substantially the same.

In either embodiment of the invention the tension in the strand 14 is maintained at a predetermined value, and at substantially the same value during tramming of the tail section 12 in either outby or inby directions, the lower back pressure across the motor pump 91 being compensated for by the tension induced by the tramming movement in a conveyor extending direction of the tail section 12.

While the invention has been described in terms of a number of embodiments thereof its scope is intended to be limited only by the claims here appended.

I claim as my invention:

1. In an extensible rope side frame conveyor, head and tail sections having an orbitally movable variable length conveyor belt trained therebetween, said tail section having power actuated tramming means for moving it relative to the head section to vary the effective length of the conveyor and tram control means selective to actuate said tramming means in forward and reverse directions, flexible strand means extending between said sections and having a supporting connection with the load-carrying run of the belt, said tail section having means for maintaining a predetermined load-supporting tension in said strand means while automatically paying out and taking up the same as the tail section is moved forward and backward comprising a winding member about which said strand means is wrapped, a motor-pump operable as a motor to drive said winding member in a direction to wind in strand means, a pump, a pressure line connecting said pump to said motor-pump, said motor-pump being operable as a pump when said strand means is pulled off of said winding member, and means for imposing on said motor-pump a predetermined supply pressure when it is operating as a motor and a lower back pressure when it is being driven by the winding member and acting as a pump including a pair of pressure relief means connected to said pressure line and effective to relieve pressure therefrom, and a valve element cooperating with said pair of pressure relief means and movable between a first position for controlling one of said pair of pressure relief means to relieve said pressure line at a relatively high pressure and a second position for controlling the other of said pair of pressure relief means to relieve said pressure line at a relatively lower pressure, and means connecting said tram control means and said valve element for conjoint movement to effect relief of said pressure line at different values depending on the direction of tramming movement of the tail section, and brake means for said motor-pump and said power actuated tramming means, said brake means being released upon actuation of said control means.

2. In an extensible rope side frame conveyor, head and tail sections having an orbitally movable variable length conveyor belt trained therearound, said tail section having power actuated tramming means for moving it relative to the head section to vary the effective length of the conveyor and tram control means selective to actuate said tramming means in forward and reverse directions, flexible strand means extending between said sections and having a supporting connection with the load-carrying run of the belt, said tail section having means for maintaining a predetermined load-supporting tension in said strand means while automatically paying out and taking up the same as the tail section is moved forward and backward comprising a winding member about which said strand means is wrapped, a motor-pump operable as a motor to drive said winding member in a direction to wind in said strand means, a pump, a pressure line connecting said pump to said motor-pump, said motor-pump being operable as a pump when said strand means is pulled off of said winding member, means for imposing on said motor-pump a predetermined supply pressure when it is operating as a motor and a lower back pressure when it is being driven by the winding member and acting as a pump including pressure relief means connected to said pressure line and effective to relieve pressure therefrom and a valve element cooperating with said pressure relief means and movable between a first position for controlling said relief means to relieve said pressure line at a relatively high pressure and a second position to relieve said pressure line at a relatively lower pressure, means connecting said tram control means and said valve element for conjoint movement to effect relief of said pressure line at different values depending on the direction of tramming movement of the tail section, and brake means for said motor-pump and said power actuated tramming means, said brake means being released upon actuation of said tram control means.

3. In an extensible rope side frame conveyor, head and tail sections having an orbitally movable variable length conveyor belt trained therebetween, said tail section having power actuated tramming means for moving it relative to the head section to vary the effective length of the conveyor and tram control means selective to actuate said tramming means in forward and reverse directions, flexible strand means extending between said sections and having a supporting connection with the load-carrying run of the belt, said tail section having means for maintaining a predetermined load-supporting tension in said strand means while automatically paying out and taking up the same as the tail section is moved forward and backward comprising a winding member about which said strand means is wrapped, a motor-pump operable as a motor to drive said winding member in a direction to wind in said strand means, a pump, a pressure line connecting said pump to said motor-pump, said motor-pump being operable as a pump when said strand means is pulled off of said winding member, means for imposing on said motor-pump a predetermined supply pressure when it is operating as a motor and a lower back pressure when it is being driven by the winding member and acting as a pump including a pair of pressure relief means connected to said pressure line and effective to relieve pressure therefrom, and a valve element cooperating with said pressure relief means and movable between a first position for controlling said pressure relief means to relieve said pressure line at a relatively high pressure and a second position for controlling said pressure relief means to relieve said pressure line at a relatively lower pressure, and means connecting said tram control means and said valve element for conjoint movement to effect relief of said pressure line at different values depending on the direction of tramming movement of the tail section.

4. In an extensible rope side frame conveyor, head and tail sections having an orbitally movable variable length conveyor belt trained therebetween, said tail section having power actuated tramming means for moving it relative to the head section to vary the effective length of the conveyor and tram control means selective to actuate said tram means in forward and reverse directions, flexible strand means extending between said sections and having a supporting connection with the load-carrying run of the belt, said tail section having means for maintaining a predetermined load-supporting tension in said strand means while automatically paying out and taking up the same as the tail section is moved forward and backward comprising a winding member about which said strand means is wrapped, a motor-pump operable as a motor to drive said winding member in a direction to wind in said strand means, a pump, a pressure line connecting said pump to said motor pump, said motor-pump being operable as a pump when said strand means is pulled off of said winding member, and means for imposing on said motor-pump a predetermined supply pressure when it is operating as a motor and a lower back pressure when it is being driven by the winding member and acting as a pump including pressure relief means connected to said pressure line and effective to relieve fluid therefrom and a valve element cooperating with said pressure relief means and movable to a first position for controlling said relief means to relieve said pressure line at a relatively high pressure and to a second position for controlling said relief means to relieve said pressure line at a relatively lower pressure, and means connecting said tram control means and said valve element for conjoint movement to effect relief of said pressure line at different values depending on the direction of tramming movement of the tail section.

5. In an extensible rope side frame conveyor, head and tail sections having an orbitally movable variable length conveyor belt trained therebetween, said tail section having power actuated moving means for moving it relative to the head section to vary the effective length of the conveyor and control means for said moving means selectively movable to positions to energize said moving means for forward and reverse movement; flexible strand means extending between said sections and having a supporting connection with the load-carrying run of the belt; said tail section having means for maintaining a predetermined load-supporting tension in said strand means while automatically paying out and taking up the same as the tail section is moved forward and backward comprising a winding member about which said strand means is wrapped, a motor-pump operable as a motor to drive said winding member in a direction to wind in said strand means, a pump, a pressure line connecting said pump to said motor-pump, said motor-pump being operable as a pump when said strand means is pulled off of said winding member, and means for imposing on said motor-pump a predetermined supply pressure when it is operating as a motor and a lower back pressure when it is being driven by the winding member and acting as a pump including a valve element movable to different positions and including valve means maintaining said back pressure in said pressure line at a lower value, said valve element being operable responsive to operation of said control means to a tramming position and said valve element moving to one of its said different positions to effect said changes from supply pressure to back pressure, and brake means for said motor-pump and said power actuated moving means, said brake means being released upon actuation of said power actuated means.

6. In an extensible rope side frame conveyor, head and tail sections having on orbitally movable variable length conveyor belt trained therebetween, said tail section having power actuated moving means for moving it relative to the head section to vary the effective length of the conveyor and control means for said moving means selectively movable to positions to energize said moving means for forward and reverse movement; flexible strand means extending between said sections and having a supporting connection with the load-carrying run of the belt; said tail section having means for maintaining a predetermined load-supporting tension in said strand means while automatically paying out and taking up the same as the tail section is moved forward and backward comprising a winding member about which said strand means is wrapped, a motor-pump operable as a motor to drive said winding member in a direction to wind in strand means, a pump, a pressure line connecting said pump to said motor-pump, said motor-pump being operable as a pump when said strand means is pulled off of said winding member and means for imposing on said motor-pump a predetermined supply pressure when it is operating as a motor and a lower back pressure when it is being driven by the winding member and acting as a pump including a valve element movable between different positions including valve means maintaining said back pressure in said pressure line at a lower value, said valve element being movable responsive to operation of said control means to a tramming position to move said valve element to a position to effect said changes from supply pressure to back pressure.

7. In an extensible rope side frame conveyor, head and tail sections having an orbitally movable variable length conveyor belt trained therebetween, said tail section having power actuated moving means for moving it relative to the head section to vary the effective length of the conveyor and control means for said moving means being selective to positions to energize said moving means for forward and reverse movement; flexible strand means extending between said sections and having a supporting connection with the load-carrying run of the belt; said tail section having means for maintaining a predetermined load-supporting tension in said strand means while automatically paying out and taking up the same as the tail section is moved forward and backward comprising a winding member about which said strand means is wrapped, a motor-pump operable as a motor to drive said winding member in a direction to wind in said strand means, a pump, a pressure line connecting said pump to said motor-pump, said motor-pump being operable as a pump when said strand means is pulled off of said winding member and means for imposing on said motor-pump a predetermined supply pressure when it is operating as a motor and a lower back pressure when it is being driven by the winding member and acting as a pump including a valve element movable to different positions to effect said changes in pressure, said valve element being movable responsive to operation of said control means to a tramming position to effect said changes from supply pressure to back pressure, and brake means for said motor-pump, said brake means being released upon actuation of said moving means.

8. In an extensible rope side frame conveyor, head and tail sections having an orbitally movable variable length conveyor belt trained therebetween, said tail section having power actuated moving means for moving it relative to the head section to vary the effective length of the conveyor and control means for said moving means selectively operable to positions to energize said moving means for forward and reverse movement; flexible strand means extending between said sections and having a supporting connection with the load-carrying run of the belt; said tail section having means for maintaining a predetermined load-supporting tension in said strand means while automatically paying out and taking up the same as the tail section is moved forward and backward comprising a winding member about which said strand means is wrapped, a motor-pump operable as a motor to drive said winding member in a direction to wind in said strand means, a pump, a pressure line connecting said pump to said motor-pump, said motor-pump being operable as a pump when said strand means is pulled off of said winding member, and means for imposing on said motor-pump a predetermined supply pressure when it is operating as a motor and a lower back pressure when it is being driven by the winding member and acting as a pump, said latter means being movable responsive to operation of said control means to a tramming position to effect said changes from supply pressure to back pressure.

9. In an extensible rope side frame conveyor, head and tail sections having an orbitally movable variable length conveyor belt trained therebetween, said tail section having power actuated moving means for moving it relative to the head section to vary the effective length of the conveyor and control means for said moving means selectively movable to positions to energize said moving means for forward and reverse movement; flexible strand means extending between said sections and having a supporting connection with the load-carrying run of the belt; said tail section having means for maintaining a predetermined load-supporting tension in said strand means while automatically paying out and taking up the same as the tail section is moved forward and backward comprising a winding member about which said strand means is wrapped, a motor-pump operable as a motor to drive said winding member in a direction to wind in strand means, a pump, a pressure line connecting said pump to said motor-pump, said motor-pump being operable as a pump when said strand means is pulled off of said winding member, and means for imposing on said motor-pump a predetermined supply pressure when it is operating as a motor and a lower back pressure when it is being driven by the winding member and acting as a pump including a valve maintaining said back pressure at a lower value, and means operable responsive to operation of said control means to a tramming position to move said valve to different positions to effect said changes from supply pressure to back pressure.

10. In an extensible rope side frame conveyor, head and tail sections having an orbitally movable variable length conveyor belt trained therebetween, said tail section having power actuated moving means for moving it relative to the head section to vary the effective length of the conveyor and control means for said moving means selectively movable to positions to energize said moving means for forward and reverse movement; flexible strand means extending between said sections and having a supporting connection with the load-carrying run of the belt; said tail section having means for maintaining a predetermined load-supporting tension in said strand means while automatically paying out and taking up the same as the tail section is moved forward and backward comprising a winding member about which said strand means is wrapped, a motor-pump operable as a motor to drive said winding member in a direction to wind in strand means, a pump, a pressure line connecting said pump to said motor-pump, said motor-pump being operable as a pump when said strand means is pulled off of said winding member, and means for imposing on said motor-pump a predetermined supply pressure when it is operating as a motor and a lower back pressure when it is being driven by the winding member and acting as a pump including a valve element movable to different positions to effect said changes in pressure, and means operable responsive to operation of said control means to a tramming position to move said valve element to different positions to effect said changes from supply pressure to back pressure.

11. In an extensible strand sideframe conveyor having a movable tail section with belt-supportng strand means extending from said tail section, said strand means being trained along a course and fixed at a location remote from said tail section, tramming means operable for moving said tail section forward and backward in a direction aligned with said course to increase and decrease the effective length of said conveyor, the improvement comprising: strand tensioning means carried by said tail section comprising a winch about which said strand means is wrapped, a motor-pump drivably connected to said winch, a pump, a pressure line connecting said pump to said motor-pump, said motor-pump being operable as a motor by fluid under pressure from said pressure line upon backward movement of the tail section to wind said strand means onto said winch, said motor-pump being operable as a pump to discharge fluid under pressure into said pressure line upon forward movement of the tail section to pay off said strand means from said winch; tension control means for applying a predetermined tension to said strand means during forward and backward tramming movements of said tail section including high and low pressure relief valve means connected in said pressure line, means selectively enabling either of said relief valve means to control pressure in said pressure line, means responsive to forward operation of said tramming means enabling said low pressure relief valve means to control back pressure on said motor-pump while strand means is payed off of said winch, and means responsive to backward operation of said tramming means enabling said high pressure relief valve means to control operating pressure on said motor-pump while strand means is wound onto said winch; and means for holding tension on said strand means when said tail section is stationary including locking means carried by said tail section effective to lock movement of said strand means relative to the tail section, and means responsive to operation of said tramming means in either forward or backward direction to release said locking means to enable control of the tension in said strand means by said tension control means.

12. In an extensible strand sideframe conveyor having a movable tail section with belt-supporting strand means extending from said tail section, said strand means being trained along a course and fixed at a location remote from said tail section, tramming means operable for moving said tail section forward and backward in a direction aligned with said course to increase and decrease the effective length of said conveyor, the improvement comprising: strand tensioning means carried by said tail section comprising a winch about which said strand means is wrapped, a motor-pump drivably connected to said winch, a pump, a pressure line connecting said pump to said motor-pump, said motor-pump being operable as a motor by fluid under pressure from said pressure line upon backward movement of the tail section to wind said strand means onto said winch, said motor-pump being operable as a pump to discharge fluid under pressure into said pressure line upon forward movement of the tail section to pay off said strand means from said winch; tension control means for applying a predetermined tension to said strand means during forward and backward tramming movements of said tail section including high and low pressure relief valve means connected in said pressure line, means selectively enabling either of said relief valve means to control pressure in said pressure line, means responsive to forward operation of said tramming means enabling said low pressure relief valve means to control back pressure on said motor-pump while strand means is payed off of said winch, and means responsive to backward operation of said tramming means enabling said high pressure relief valve means to control operating pressure on said motor-pump while strand means is wound onto said winch; and means for holding tension on said strand means when said tail section is stationary including locking means carried by said tail section and biased toward a condition to lock movement of said strand means relative to the tail section, pressure-actuatable means for releasing said locking means against the bias thereof, and means responsive to operation of said tramming means in either forward or backward direction to direct pressure into said pressure-actuatable means to release said locking means for enabling control of the tension in said strand means by said tension control means.

13. The combination of claim 11 including brake means for said tramming means, and means for automatically applying said brake means to hold said tail section in place responsive to non-activation of said tramming means.

14. The combination of claim 11 including brake means for said tramming means, means biasing said brake means toward applied condition to normally hold said tail section in place, and means for releasing said brake means against said biasing means responsive to operation of said tramming means in either forward or backward direction.

No references cited.